No. 774,293. PATENTED NOV. 8, 1904.
T. H. TREGELLAS.
WEED PULLER.
APPLICATION FILED DEC. 10, 1903.
NO MODEL.
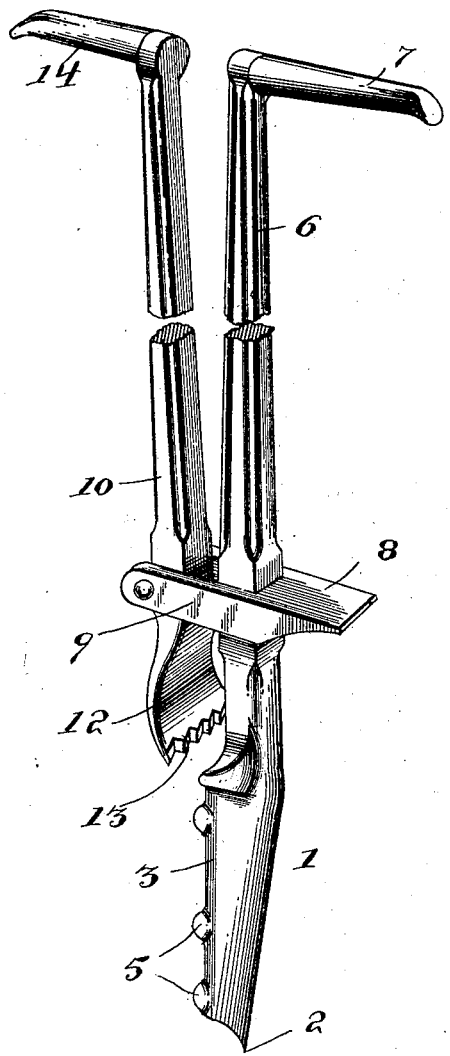
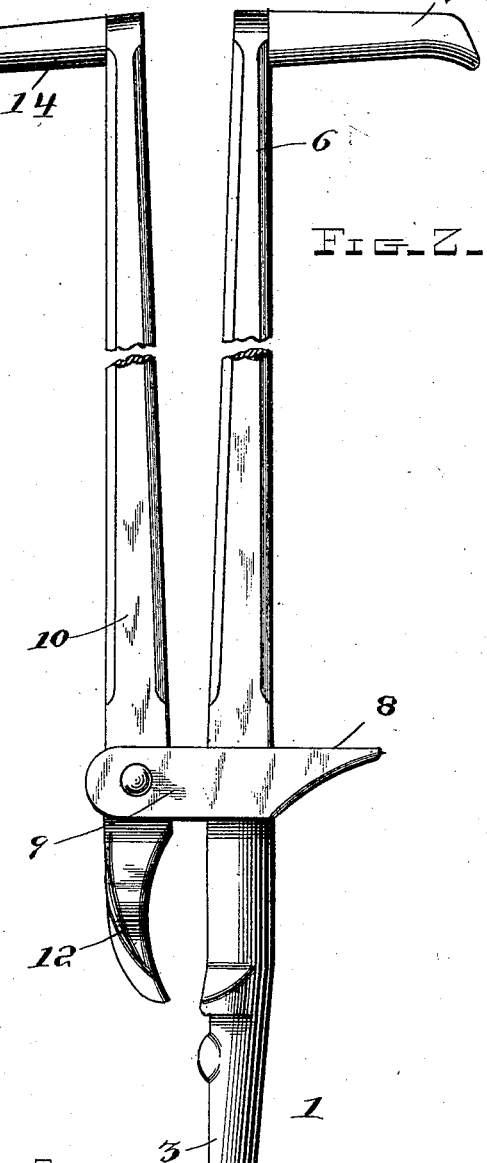
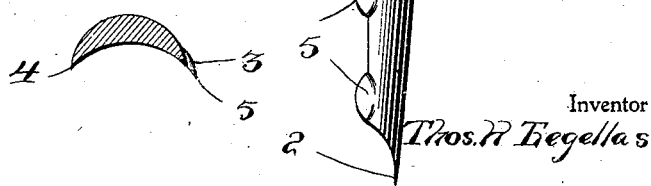
Witnesses
Inventor
Thos. H. Tregellas
By
Attorney No. 774,293. Patented November 8, 1904.

UNITED STATES PATENT OFFICE.

THOMAS H. TREGELLAS, OF IUKA, KANSAS.

WEED-PULLER.

SPECIFICATION forming part of Letters Patent No. 774,293, dated November 8, 1904.

Application filed December 10, 1903. Serial No. 184,673. (No model.)

*To all whom it may concern:*

Be it known that I, THOMAS H. TREGELLAS, a citizen of the United States, residing at Iuka, in the county of Pratt and State of Kansas, have invented certain new and useful Improvements in Weed-Pullers; and I do declare the following to be a full, clear, and exact description of the invention, such as will enable others skilled in the art to which it appertains to make and use the same.

This invention relates to improvements in weed-pullers.

The object of the invention is to provide a device of this character by which weeds may be quickly removed from lawns and other places without disturbing the grass or plants which may be growing near the weeds.

A further object is to provide a weed-puller having means by which the branching roots of the weed may be cut, so that the main root may be readily pulled out of the ground.

With these and other objects in view the invention consists of certain novel features of construction, combination, and arrangement of parts, as will be more fully described, and particularly pointed out in the appended claim.

In the accompanying drawings, Figure 1 is a perspective view of the device. Fig. 2 is a side or edge view of the same. Fig. 3 is a horizontal sectional view through the blade.

Referring more particularly to the drawings, 1 denotes a narrow curved trowel-shaped blade pointed at its lower end, as shown at 2, and provided with sharp cutting edges 3 and 4. Along the edge 3 of the blade is arranged a series of teeth 5, which project laterally beyond the cutting edge 3 of the blade and in a manner form stops which aid in cutting the roots and which when the blade is turned in the ground will prevent the branching roots from slipping away from the cutting edge 3 and will insure the severing of the same, thereby pemitting the main root of the weed to be removed without materially disturbing the soil.

The blade 1 is secured to the lower end of a handle 6, to which it may be connected in any suitable manner. On the upper end of the handle is formed or fixed a laterally-projecting handpiece or grip 7.

On the handle 6 above the blade is secured a foot-piece 8, by which the blade 1 may be forced into the ground. Formed integral with the foot-piece are a pair of forwardly-projecting lugs or ears 9, between which is pivoted a handle or lever 10, on the lower end of which is formed or fixed an inwardly-curved jaw 12, having teeth or serrations 13 formed on its lower inner edge.

On the upper end of the handle or lever 10 is formed or fixed a laterally-projecting handpiece or grip 14.

In operation the blade 1 is forced into the ground at the root of the weed and is then given a turn which will cause the toothed cutting edge to sever the branching roots of the weed. The handle or lever 10 is now moved out from the handle 6, which will cause the jaw 12 to grip the weed against the blade close to the ground. While thus holding the weed the handle 6 and blade 1 are drawn up, thereby pulling or removing the weed and root from the ground without uprooting the grass or plants growing in proximity to the weed.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a device of the character described, a transversely-curved trowel-shaped blade having a vertically-disposed plane cutting edge and spaced teeth projecting laterally at intervals from said edge for the purpose set forth, and gripping means to coact with said blade to grip and pull the weed.

In testimony whereof I have hereunto set my hand in presence of two subscribing witnesses.

THOMAS H. TREGELLAS.

Witnesses:
 F. H. POORE,
 J. H. HICKMAN.